United States Patent

[11] 3,574,459

| [72] | Inventors | Karl Hartwig;<br>Gunther Schnall, Munich, Germany |
|---|---|---|
| [21] | Appl. No. | 754,695 |
| [22] | Filed | Aug. 22, 1968 |
| [45] | Patented | Apr. 13, 1971 |
| [73] | Assignee | AGFA - Gevaert Aktiengesellschaft<br>Leverkusen, Germany |
| [32] | Priority | Aug. 24, 1967 |
| [33] | | Germany |
| [31] | | A56,589 |

[54] OPTICAL COPYING APPARATUS
9 Claims, 2 Drawing Figs.

[52] U.S. Cl. .................................................. 355/66
[51] Int. Cl. ......................................................... G03b 27/70
[50] Field of Search ............................................ 355/11, 53, 51, 66, 8

[56] References Cited
UNITED STATES PATENTS
3,260,154  7/1966  Tehejeyan et al. ............. 355/66X
3,481,670  12/1969  Amemiya et al. .............. 355/66

*Primary Examiner*—John M. Horan
*Assistant Examiner*—Michael Harris
*Attorney*—Michael S. Striker ABSTRACT: Optical copying apparatus wherein a transparent support for a positive or negative original is movable back and forth in or counter to the direction of travel of the copy. The light source is stationary so that it illuminates successive increments of the original on the moving support. The optical system comprises two axially spaced objective lenses and an image inverting optical device (such as an Abbe prism) which is located between the lenses and is turnable through 90° about the optical axis to assume a first position when the support travels in one direction of a second position when the support travels in the opposite direction. The support is reciprocated by the drive for the copy, and such drive also changes the position of the optical device when the support changes the direction of its movement.

INVENTOR.
KARL HARTWIG
GÜNTHER SCHNALL

BY Michael S. Striker

OPTICAL COPYING APPARATUS

BACKGROUND OF THE INVENTION

The present invention relates to optical copying apparatus in general, and more particularly to improvements in optical copying apparatus of the type wherein the image of an original is reproduced on a copy which is transported past the copying station and wherein the original moves with reference to the light source.

In presently known optical copying apparatus, the original is held at a standstill and a light reflecting mirror or the objective lens system is moved at a constant rate relative to the original to bring about reproduction of successive increments of the picture. In certain other conventional copying apparatus, the original is moved past the illuminated field of view of a stationary lens system. The copy (e.g., a web of printing paper) is fed at a rate which is proportional to the speed of the lens system or light source. Not only the speeds but also the directions of movement of the light source, lens system, original and copy must be maintained in a predetermined relationship which is determined by the nature of the optical system in the copying apparatus. Since the copy is normally stored on a reel, it can only be drawn in a single predetermined direction. Therefore, the mirror, the support for the original and/or the lens system must be returned to starting position prior to each copying step. The weight and the sensitivity of such mobile parts limit the speeds of return movement to starting position, i.e., such speed cannot substantially exceed the speed at which the parts move in the course of a copying operation. In other words, about half the time is spent for return movement to starting position.

SUMMARY OF THE INVENTION

One of the objects of our invention is to provide an optical copying apparatus wherein the intervals between successive copying operations can be reduced to a mere fraction of the time required for reproduction of an image.

Another object of the invention is to provide a novel optical system for use in an optical copying apparatus for the just outlined character.

A further object of the invention is to provide an optical copying apparatus wherein the support for the original need not return to a starting position upon completion of a copying operation.

An additional object of the invention is to provide an optical copying apparatus which employs a stationary objective and a stationary light source.

Still another object of the invention is to provide an optical copying apparatus wherein a single drive suffices to impart motion to all mobile parts.

The improved optical copying apparatus comprises support means for moving positive or negative originals in a first direction and in a second direction counter to the first direction, an objective system for focusing the image of the moving original carried by the support means onto a copy which travels in substantial parallelism with one of the two directions, a source of light for illuminating successive increments of the original on the support means, and an image inverting optical device mounted between the support means and the traveling copy for rotation about the optical axis of the objective system between first and second positions which it respectively assumes when the support means respectively moves in the first and second directions.

The optical device may include an Abbe prism or another prism which rotates the beam at twice the rate of rotation of the prism. Thus, such a prism can invert the image of the original in response to rotation through 90°. Consequently, the apparatus can reproduce the image of an original onto the traveling copy while the support means moves in the first or in the second direction so that the support means need not be returned to a starting position prior to each copying operation.

The novel features which are considered as characteristic of the invention are set forth in particular in the appended claims. The improved copying apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
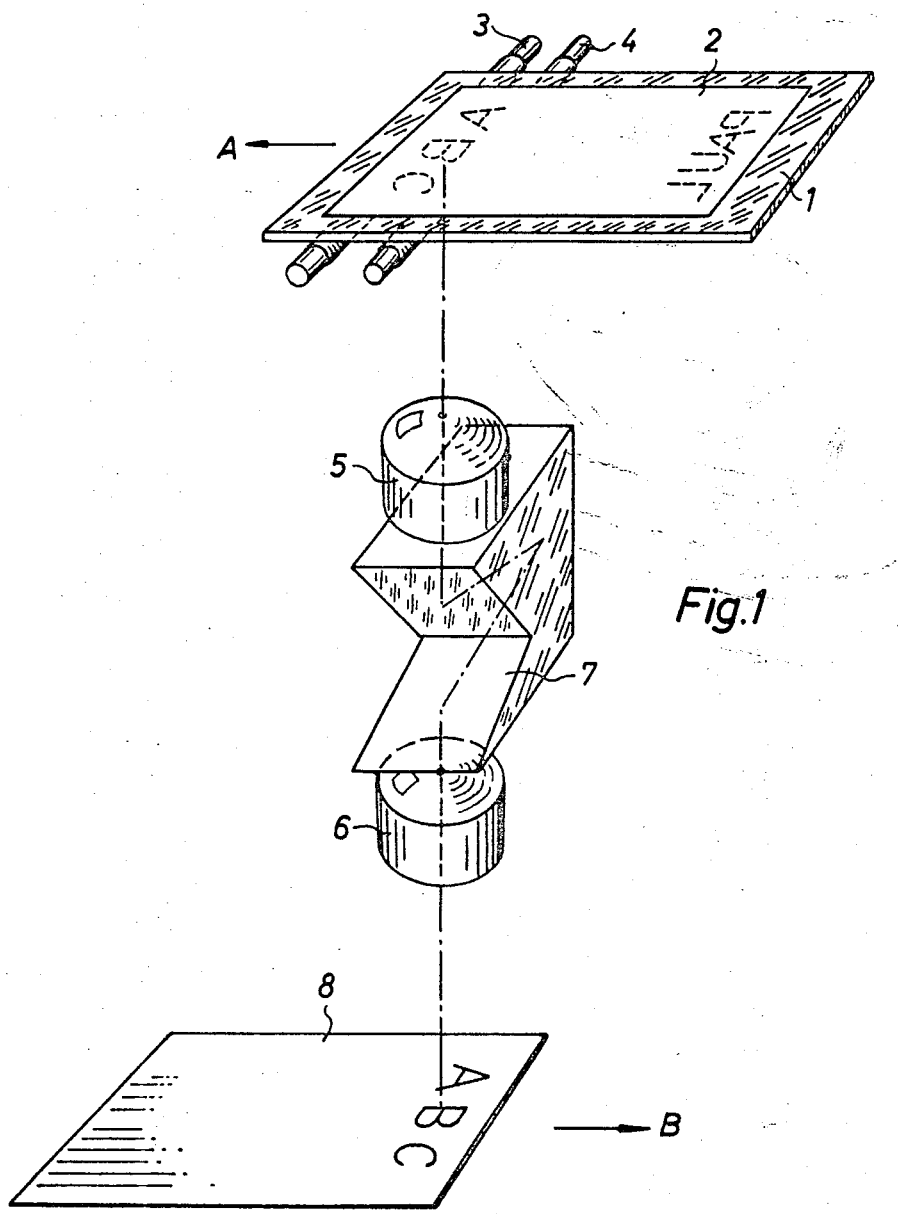
FIG. 1 is a diagrammatic perspective view of an optical copying apparatus which embodies the invention.

FIG. 1 illustrates a sheetlike transparent positive or negative original 2 which is supported by a transparent or translucent horizontal carriage or support 1. The light source comprises two stationary parallel fluorescent tubes 3, 4 which extend across the path of movement of the carriage to illuminate successive increments or strips of the original 2 as the latter advances with the carrier 1 in the direction indicated by arrow A. The optical system of the copying apparatus comprises a two-piece objective including lenses 5, 6 and an Abbe prism 7 between the lenses. The copy 8 is transported in a horizontal plane in the direction indicated by arrow B.

The reproduction of image of the original 2 is effected in such a way that the reproduced image is a mirror symmetrical replica of the image of the original. This is necessary in electrophotographic copying processes which employ ZnO paper. In a transfer process, e.g., in a xerographic or a silver salt diffusion process, a further mirror must be inserted into the path of light.

Figure 2:
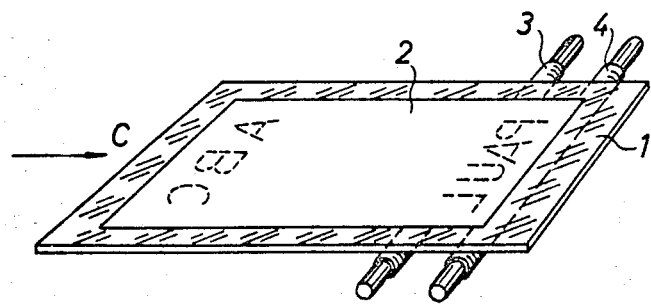
FIG. 2 is a similar perspective view but showing the optical device in a different position.
Figure 2:
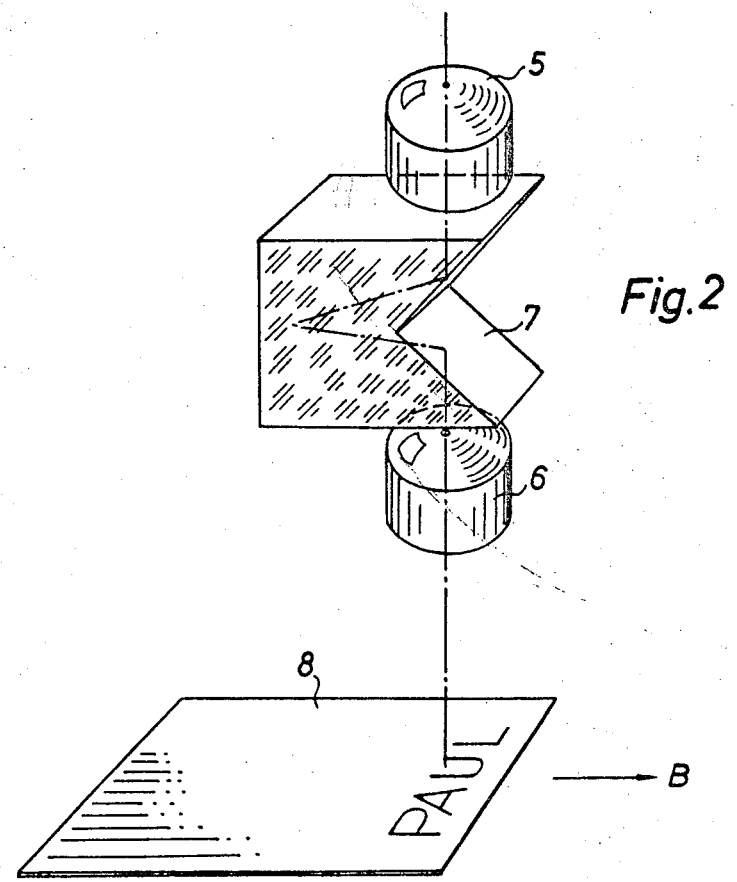

In FIG. 1, the angular position of the prism 7 is such that the carriage 1 must be advanced in the direction indicated by arrow A, i.e., in the direction in which the copy 8 is being drawn by a suitable drive from a reel or another suitable source of supply. In FIG. 2, the angular position of the prism 7 is changed by 90°. This causes the light beam to rotate at twice the rate of rotation of the prism. Consequently, the carriage 1 can move in the direction indicated by arrow C while the copy 8 continues to move in the direction indicated by arrow B. In other words, no time is lost between successive operations because the carrier 1 need not return to a starting position.

The Abbe prism 7 of FIGS. 1 and 2 can be replaced by other optical devices which invert the beam of light. For example, one can employ a Koenig prism or a roof prism positioned to rotate back and forth about the optical axis through an angle of 90°. The carriage 1 can derive motion from the drive which advances the copy 8 but in such a way that the carriage can move in and counter to the direction indicated by arrow B. The prism 7 is located in a plane which is parallel to the direction of travel of the copy 8 (FIG. 2) when the carriage 1 moves in one direction but is moved into a plane which is normal to the direction of travel of the copy (FIG. 1) when the carriage moves in the opposite direction. The fact that the image which is reproduced during travel of the carrier 1 in one direction is turned by 180° with reference to the image which is produced when the carriage travels in the opposite direction is of no consequence because the copy is severed anyway so that the orientation of successively reproduced images is immaterial.

The aforementioned prisms can be replaced by many other types of prisms, for example, by those which are often employed in telescopes. They include Dove, Amici, Schmidt, Pechan and Porro prisms as well as pairs of cylindrical lenses employed for image inversion in astronomical telescopes.

The compactness of the optical system is enhanced if the prism or prisms are placed between the lenses of the objectives.

We claim:

1. Optical copying apparatus comprising support means for moving originals in a first direction and in a second direction counter to said first direction, an objective system for focusing the image of the original moving with said support means onto a copy which travels in substantial parallelism with one of said directions; a source of light for illuminating successive increments of the original on said support means; and an image inverting optical device mounted between said support means and the traveling copy for rotation about the optical axis of said objective system between first and second positions which it respectively assumes when said support means respectively moves in said first and second directions.

2. Optical copying apparatus as defined in claim 1, wherein said light source and said objective system are disposed at the opposite sides of said support means and wherein said support means consists of light-transmitting material.

3. Optical copying apparatus as defined in claim 1, wherein said optical device is rotatable back and forth through 90° degrees.

4. Optical copying apparatus as defined in claim 1, wherein said support means and the copy are movable in substantially horizontal planes located at different levels.

5. Optical copying apparatus as defined in claim 1, further comprising drive means for transporting the copy in parallelism with said one direction and for moving said support means in one of said first and second directions.

6. Optical copying apparatus as defined in claim 5, wherein said drive means comprises means for changing the angular position of said optical device in response to changes in the direction of movement of said support means.

7. Optical copying apparatus as defined in claim 1, wherein said optical device is respectively located in planes which are parallel with and normal to the direction of movement of the copy in said first and second positions thereof.

8. Optical copying apparatus as defined in claim 1, wherein said objective system comprises a pair of lenses and wherein said optical device is located between said lenses.

9. Optical copying apparatus as defined in claim 1, wherein said light source comprises a plurality of elongated fluorescent tubes extending substantially at right angles to the directions of movement of said support means.